(12) United States Patent
Butzke et al.

(10) Patent No.: US 11,014,102 B2
(45) Date of Patent: May 25, 2021

(54) SHOWER JET GENERATING DEVICE HAVING AN OVERPRESSURE VALVE

(71) Applicant: Hansgrohe SE, Schiltach (DE)

(72) Inventors: Klaus Butzke, Schiltach (DE); Marc Kalmbach, Aichhalden (DE); Ulrich Kinle, Schenkenzell (DE)

(73) Assignee: Hansgrohe SE, Schiltach (DE)

( * ) Notice: Subject to any disclaimer, the term of this patent is extended or adjusted under 35 U.S.C. 154(b) by 188 days.

(21) Appl. No.: 16/256,984

(22) Filed: Jan. 24, 2019

(65) Prior Publication Data

US 2019/0224697 A1   Jul. 25, 2019

(30) Foreign Application Priority Data

Jan. 25, 2018 (DE) ...................... 10 2018 201 183.4

(51) Int. Cl.
*B05B 1/32* (2006.01)
*B05B 1/18* (2006.01)
(Continued)

(52) U.S. Cl.
CPC .............. *B05B 1/323* (2013.01); *B05B 1/185* (2013.01); *B05B 1/3006* (2013.01); *B05B 1/36* (2013.01);
(Continued)

(58) Field of Classification Search
CPC ....... B05B 1/323; B05B 1/185; B05B 1/3006; B05B 1/36; B05B 15/528; B05B 1/18;
(Continued)

(56) References Cited

U.S. PATENT DOCUMENTS 1,236,617 A * 8/1917 Speakman .......... B05B 15/5225
                                                      239/118
3,734,410 A * 5/1973 Bruno ..................... E03C 1/086
                                                      239/381
(Continued)

FOREIGN PATENT DOCUMENTS

AT          252826 B        3/1967
CN       202527296 U       11/2012
(Continued)

OTHER PUBLICATIONS

Office Action (in German language), dated Sep. 10, 2018, issued by the German Patent Office for German Application No. 10 2018 201 183.4.
(Continued)

*Primary Examiner* — Joseph A Greenlund
(74) *Attorney, Agent, or Firm* — Bose McKinney & Evans LLP

(57) ABSTRACT

A shower jet generating device for a shower head, illustratively for a sanitary shower head, including a shower jet disk delimiting a fluid chamber on an outlet side and including at least one jet outlet opening leading out of the fluid chamber and at least one overpressure valve opening, and comprising at least one overpressure valve disposed on the overpressure valve opening. The overpressure valve illustratively includes an overpressure outlet opening leading out of the fluid chamber, an immobile valve seat and a valve body capable of movement controlled by a fluid pressure in the fluid chamber and interacting with the valve seat, which valve body, in a normal pressure position, rests against the valve seat, thereby closing the overpressure outlet opening, and, in an overpressure position, is lifted off the valve seat, thereby exposing the overpressure outlet opening.

12 Claims, 3 Drawing Sheets

(51) Int. Cl.
  B05B 1/30      (2006.01)
  E03C 1/04      (2006.01)
  B05B 1/36      (2006.01)
  B05B 15/528    (2018.01)
  B05B 12/08     (2006.01)
  F16K 15/14     (2006.01)

(52) U.S. Cl.
  CPC .......... B05B 12/088 (2013.01); B05B 15/528 (2018.02); E03C 1/0404 (2013.01); E03C 1/0408 (2013.01); F16K 15/14 (2013.01); *E03C 2201/70* (2013.01)

(58) Field of Classification Search
  CPC ................ E03C 1/0404; E03C 1/0408; F16K 15/14–148
  See application file for complete search history.

(56) References Cited

U.S. PATENT DOCUMENTS

| | | | |
|---|---|---|---|
| 4,129,143 A | | 12/1978 | Hoffmann |
| 4,838,486 A * | | 6/1989 | Finkbeiner .......... B05B 15/5225 239/117 |
| 5,246,301 A * | | 9/1993 | Hirasawa ............. A46B 11/063 401/28 |
| 5,702,057 A * | | 12/1997 | Huber ................... B05B 15/528 239/288.3 |
| 6,382,531 B1 * | | 5/2002 | Tracy .................... B05B 1/185 239/548 |
| 8,240,583 B2 * | | 8/2012 | Cristina ................. B05B 1/18 239/533.14 |
| 8,985,483 B2 * | | 3/2015 | Petrovic ................ B05B 1/262 239/396 |
| 9,004,380 B2 * | | 4/2015 | Qi ........................... B05B 1/18 239/432 |
| 9,199,252 B2 | | 12/2015 | Schorn et al. |
| 9,539,590 B2 | | 1/2017 | Vorel |
| 2003/0062426 A1 * | | 4/2003 | Gregory ................ B05B 1/185 239/107 |
| 2008/0011880 A1 * | | 1/2008 | Butzke ................. B05B 7/0425 239/428.5 |
| 2011/0297759 A1 * | | 12/2011 | Morbio ................. B05B 7/0425 239/428.5 |
| 2014/0034758 A1 | | 2/2014 | Buehler et al. |
| 2015/0196927 A1 * | | 7/2015 | Ramos De Barros .... B05B 1/18 239/107 |
| 2016/0332173 A1 * | | 11/2016 | Butzke ..................... B05B 1/06 |
| 2018/0078953 A1 * | | 3/2018 | Renner .................... B05B 1/18 |
| 2018/0099295 A1 * | | 4/2018 | Armbruster ............ B05B 1/323 |
| 2018/0178225 A1 * | | 6/2018 | Butzke .................... B05B 1/185 |
| 2018/0250690 A1 * | | 9/2018 | Nobili ..................... B05B 1/185 |
| 2019/0176169 A1 * | | 6/2019 | Zhuo .................... B05B 15/5225 |
| 2019/0224697 A1 * | | 7/2019 | Butzke ..................... B05B 1/36 |

FOREIGN PATENT DOCUMENTS

| | | | | |
|---|---|---|---|---|
| CN | 104971834 A | 10/2015 | | |
| DE | 2628314 A1 | 1/1978 | | |
| DE | 102005012706 A1 | 9/2006 | | |
| DE | 102012213518 B3 | 11/2013 | | |
| DE | 102016213491 A1 | 1/2018 | | |
| DE | 102016219551 A1 | 4/2018 | | |
| DE | 102016225987 A1 | 6/2018 | | |
| EP | 1619315 A1 | 1/2006 | | |
| EP | 3053655 A1 | 8/2016 | | |
| EP | 2888054 B1 * | 10/2016 | ............. | B05B 1/185 |
| KR | 20160061459 A | 6/2016 | | |
| RU | 2534088 C1 | 11/2014 | | |
| RU | 2620436 C2 | 5/2017 | | |

OTHER PUBLICATIONS

European Search Report (in German language) issued by the European Patent Office, Munich, Germany, dated Jun. 25, 2019, for European Patent Application No. 19153182.1.
Search Report and Decision to Grant in Russian language with English translation issued by The Federal Service for Intellectual Property, Patents and Trademarks (ROSPATENT), dated Jul. 25, 2019, for Russian Patent Application No. 2019101497/05(002484).
Office Action issued by the National Intellectual Property Administration, P.R. China, dated Aug. 26, 2020 for Chinese Patent Application No. 201910072578.0, 20 pages.

* cited by examiner

SHOWER JET GENERATING DEVICE HAVING AN OVERPRESSURE VALVE

CROSS-REFERENCE TO RELATED APPLICATION

This application claims priority to German Patent Application No. DE 10 2018 201 183.4, filed on Jan. 25, 2018, the disclosure of which is expressly incorporated herein by reference.

BACKGROUND AND SUMMARY OF THE DISCLOSURE

The invention relates to a shower jet generating device for a shower head, illustratively for a sanitary shower head, including a shower jet disk delimiting a fluid chamber on an outlet side and including at least one jet outlet opening leading out of the fluid chamber and at least one overpressure valve opening, and including at least one overpressure valve disposed on the overpressure valve opening. The overpressure valve illustratively includes an overpressure outlet opening leading out of the fluid chamber, an immobile valve seat and a valve body capable of movement controlled by a fluid pressure in the fluid chamber and interacting with the valve seat, which valve body, in a normal pressure position, rests against the valve seat, thereby closing the overpressure outlet opening, and, in an overpressure position, is lifted off the valve seat, thereby exposing the overpressure outlet opening.

Shower jet generating devices of this kind are used, for example, in sanitary shower heads, such as hand-held showers, overhead showers and lateral jet showers in shower installations. In the present case, normal pressure means a pressure range of the fluid pressure in the fluid chamber, often also referred to as the internal pressure of an associated shower or of an associated shower head, when the shower jet generating device is in normal, fault-free operation while being used as intended. This normal pressure should not exceed a suitably preset limiting pressure, it being possible, for example, to set the limiting pressure to a value of about 0.9 bar or higher, e.g. to about 1 bar or about 3 bar or about 5 bar, depending on the area of use and purpose of use of the shower jet generating device.

One known problem of these devices is that, when operated with hard water or contaminated water, one or, generally, several jet outlet openings may be partially or completely blocked by lime scale deposits or dirt particles and, as a result, the pressure in the fluid chamber may rise in an unwanted manner. Shower jet generating devices, the jet outlet openings of which have a relatively small diameter, e.g. for generating a "fine needle jet", are also particularly prone to this problem. Such a pressure rise can lead to an overpressure in the fluid chamber, which may cause damage to components exposed to this overpressure. Moreover, the shower jet characteristic may change in an unwanted manner as a result. In the present case, overpressure accordingly means a pressure in the fluid chamber which is higher than the normal pressure, in particular a fluid pressure which is above the limiting pressure. The setting of the limiting pressure is expediently chosen in such a way that a rise in the internal pressure of the shower jet generating device, which can reach critically high values in the case of scale-encrusted or clogged/blocked jet outlet openings even at only about 1 bar of flow pressure of the fluid upstream of the shower head concerned, does not have any unwanted effects as long as the internal pressure does not exceed the limiting pressure.

As long as there is no overpressure, the movable valve body rests against the valve seat, thereby closing the overpressure outlet opening. In active operation of the shower jet generating device, the fluid can enter the one or more jet outlet openings via the fluid chamber and emerge from this opening or these openings to form the corresponding shower jet. When overpressure occurs, the valve body rises from the valve seat, thereby exposing the overpressure outlet opening. Via the exposed overpressure outlet opening, fluid can then emerge from the fluid chamber, thereby enabling the overpressure in the fluid chamber to be dissipated.

Chinese Laid-Open Publication CN 104971834 A and Utility Model Publication CN 202527296 U disclose shower jet generating devices of the type stated at the outset in which the overpressure valve comprises a hollow cylindrical valve housing, which is disposed in the overpressure valve opening of the shower jet disk and on a front region of which the valve seat and the overpressure outlet opening in the form of an opening extending through the valve seat are provided. The valve body is designed as an axially movable valve pin, a head region of which closes the overpressure outlet opening when it rests against the valve seat and which is held in such a way as to be preloaded in the closed position on the valve housing under the preload of a helical spring.

Patent Publication AT 252826 discloses a shower head with overpressure safeguard, in which an annular gap is left between the shower jet disk and a surrounding shower head housing, in which there is a seal ring fitted into a circumferential annular groove on the shower jet disk. Overpressure outlet openings are provided on the bottom of the annular groove, these being closed by the seal ring at normal pressure and exposed by the seal ring in the case of overpressure, with the seal ring being expanded elastically by the overpressure.

German Patent Application 10 2016 219 551 describes a shower jet generating device with protection against dripping in which a movable fluid outlet element is disposed on one or more jet outlet openings of a jet disk, the element comprising a movable valve body having a fluid outlet opening that leads out of a fluid chamber upstream of the shower jet disk. The movable valve body interacts with an immobile valve seat, which, depending on a fluid pressure in the fluid chamber, exposes the fluid outlet opening in an open position of the fluid outlet element and shuts off the fluid outlet element in a shut-off position. The normal fluid operating pressure in the fluid chamber ensures that the fluid outlet element is in the open position. When there is no fluid pressure in the fluid chamber or this pressure is at any rate not yet higher than a preset limiting pressure or minimum pressure lower than normal pressure of, for example, 0.2 bar to 0.35 bar, the fluid outlet element is in its shut-off position and prevents dripping.

German Patent Application 10 2016 213 491 describes a shower jet generating device of the type stated at the outset in which the overpressure outlet opening is formed by the overpressure valve opening of the jet disk or by a jet outlet nipple extending through the latter, and in which a deformable valve element, which can be moved in a controlled manner by deformation between a normal pressure position and an overpressure position by the pressure prevailing in the fluid chamber, acts as a movable valve body. The deformable valve element can be, for example, a sealing flap, a deformable sealing membrane or a deformable disk element which delimits the fluid chamber on a side facing away from the shower jet disk.

German Patent Application 10 2016 225 987 describes a shower jet generating device which is advantageously suitable for generating a fine needle jet as a shower jet, for which purpose a jet outlet element disposed in a respective jet disk opening is of pot-shaped design with a bottom on the outlet side, a side wall and a hollow chamber delimited by the bottom and the side wall, wherein the bottom is disposed in such a way as to face in the jet outlet direction and has a plurality of fine jet openings. The fine jet openings can have a very small outlet cross-section of, for example, no more than 0.2 mm$^2$ or 0.1 mm$^2$. The bottom and the side wall are illustratively formed from an elastic material in such a way that the jet outlet element can be convexly deformed in normal shower operation by the prevailing normal pressure of the shower fluid.

It is an object of the invention to provide a shower jet generating device of the type stated at the outset which can be produced with relatively little outlay and is advantageous particularly as regards its overpressure valve implementation.

The invention achieves this and other objects by providing a shower jet generating device comprising a shower jet disk delimiting a fluid chamber on an outlet side and including at least one jet outlet opening leading out of the fluid chamber and at least one overpressure valve opening. At least one overpressure valve is disposed on the overpressure valve opening, which overpressure valve includes an overpressure outlet opening leading out of the fluid chamber, an immobile valve seat and a valve body capable of movement controlled by a fluid pressure in the fluid chamber and interacting with the valve seat, which valve body, in a normal pressure position, rests against the valve seat, thereby closing the overpressure outlet opening, and, in an overpressure position, is lifted off the valve seat, thereby exposing the overpressure outlet opening.

In this shower jet generating device, the valve body is formed as a valve membrane body made of an elastic material. The valve membrane body comprises a cylindrical central portion extending into the overpressure valve opening and a boundary portion surrounding the central portion, the boundary portion being deformably flap-movable. The valve membrane body moves with its central portion within the overpressure valve opening between the normal pressure position and the overpressure position by the deforming flap movement of its boundary portion, with a main directional component perpendicular to the shower jet disk. Here, the term main directional component should be understood in its usual sense that the direction of movement of the central portion has a larger directional component perpendicularly to a disk plane of the shower jet disk than parallel to the disk plane.

This represents an advantageous implementation of the overpressure valve and, in particular, of the valve body thereof in terms of production engineering and functioning. By means of its flap-movable boundary portion, the valve membrane body can be designed in such a way that it is moved into its overpressure position from its normal pressure position only when the fluid pressure in the fluid chamber has risen to a predeterminable overpressure value which is above a normal pressure or normal pressure range of the fluid pressure in the fluid chamber when the shower jet generating device is operating in a normal, trouble-free manner. As long as the fluid pressure in the fluid chamber remains below the relevant overpressure value, the valve membrane body remains in its normal pressure position. The overpressure valve opening in the jet disk can be exploited for the mobility of the cylindrical central portion of the valve membrane body, and the central portion can be viewed from outside by the user when required via the outside of the jet disk. In an illustrative embodiment, the user can see from the position of the central portion in the overpressure valve opening whether the valve membrane body is in its normal pressure position or its overpressure position. When required, the central portion, situated in the overpressure valve opening, of the valve membrane body can furthermore correspond in shape and/or appearance to the jet outlet opening or openings of the jet disk or to a jet outlet element provided in the respective jet outlet opening. This can be desired with a view to a visually uniform appearance of the shower jet generating device on the outside of the jet disk or with a view to other design aspects. Moreover, this can be functionally advantageous in the sense that, in corresponding embodiments, the fluid emerges from the overpressure valve in a similar manner in the case of overpressure as it does in normal operation from the jet outlet opening or openings of the jet disk.

In a development of the invention, the fluid chamber, on its side facing away from the shower jet disk, is delimited by a chamber bottom plate including the valve seat. Thus, the chamber bottom plate can advantageously serve both to delimit the fluid chamber on the rear side and to provide the valve seat for the overpressure valve.

In a development of the invention, the central portion of the valve membrane body is hollow cylindrical and comprises the overpressure outlet opening, wherein the overpressure outlet opening leads out of the valve membrane body on its side facing away from the valve seat. In this case, the central portion advantageously serves to provide the overpressure outlet opening, and the overpressure outlet opening can emerge on the outside of the shower jet disk, like the at least one jet outlet opening. Fluid that is discharged from the fluid chamber via the overpressure valve in the case of overpressure can thus emerge from the shower jet disk on the same side and, when required, with a similar fluid outlet characteristic as does the fluid from the jet outlet opening or openings in normal operation.

In a development of the invention, the central portion of the valve membrane body is hollow cylindrical and comprises the overpressure outlet opening, and the overpressure outlet opening leads into the valve membrane body on its side facing towards the valve seat. As a result, in the normal pressure position, in which the valve membrane body is situated as long as there is no case of overpressure, i.e. when there is no fluid pressure or a normal fluid operating pressure in the fluid chamber, the overpressure outlet opening can thereby be held closed in a very simple manner by virtue of the fact that the valve membrane body with the inlet of the overpressure outlet opening in its central portion rests against the valve seat.

In one embodiment of the invention, the valve seat comprises a shut-off contour, which engages in an input region of the overpressure outlet opening in the valve membrane body, in the normal pressure position of the valve membrane body. This is advantageous for reliable fluid-tight closure of the overpressure outlet opening and can be achieved with a relatively low outlay.

In another embodiment of the invention, the shut-off contour is formed by a conical or spherical shut-off projection, this being advantageous in respect of the sealing behavior and production outlay.

In addition, or as an alternative to the shut-off contour, in one embodiment of the invention an input region of the overpressure outlet opening in the valve membrane body comprises a frustoconical outer contour, in the normal pressure position of the valve membrane body, and the valve seat has a corresponding frustoconical inner contour. This too once again represents an advantageous, simple way of achieving fluid-tight closure of the overpressure outlet opening in the normal pressure position of the valve membrane body.

In a development of the invention, the valve seat comprises the overpressure outlet opening, and the overpressure outlet opening leads into the valve seat on its side facing towards the valve membrane body. In this case, the valve membrane body acts as a movable closing body, which closes the overpressure outlet opening in the valve seat in the normal pressure position and exposes it in the overpressure position. The closing and exposure of the overpressure outlet opening in the valve seat can advantageously be performed by the cylindrical central portion of the valve membrane body.

In a development of the invention, the at least one jet outlet opening comprises a jet outlet nipple which is formed from the elastic material integrally with the valve membrane body. In a manner which is advantageous in terms of production technology, this allows joint manufacture of the jet outlet nipple, which acts as a fluid outlet element for the normal shower jet, and of the valve membrane body of the overpressure valve. In a corresponding embodiment, the jet outlet nipple and the valve membrane body can be joint components of a jet mat manufactured from the elastic material, which is situated on the inside of the shower jet disk, over substantially the entire area thereof, and on which both the one or more jet outlet nipples and the valve membrane body or bodies are formed. In an alternative embodiment, the jet outlet nipple and the valve membrane body are formed as respectively independent components made of the elastic material.

In a development of the invention, the at least one jet outlet opening is formed by a jet outlet nipple made of an elastic material, which nipple has a hollow cylindrical central portion extending into a nipple outlet opening of the jet disk and a deformably flap-movable boundary portion surrounding the central portion, wherein the jet outlet nipple moves with its central portion within the nipple outlet opening between a zero pressure position and a normal pressure position by the deforming flap movement of its boundary portion, with a main directional component perpendicular to the shower jet disk. Here, zero pressure position means a position which the jet outlet nipple adopts when there is no fluid pressure in the fluid chamber, and normal pressure position means the position which it adopts when the normal fluid pressure is present during the operation of the shower jet generating device. In its construction and its motion characteristic, the jet outlet nipple therefore corresponds largely to the valve membrane body and, accordingly, can be produced in a similar way with a relatively low outlay. There is the difference that the jet outlet nipple changes its position as soon as the fluid pressure in the fluid chamber rises to the normal pressure level during operation, whereas the valve membrane body changes its position only when the fluid pressure in the fluid chamber rises to an overpressure value above the normal pressure level owing to a case of overpressure. In particular, the jet outlet nipple can be a movable fluid outlet element of the kind described in the above mentioned German Patent Application 10 2016 219 551, the contents of which are herewith incorporated by reference into the present application and to which reference can be made for further details in relation to a fluid outlet element of this kind.

In a development of the invention, the shower jet disk comprises at least two overpressure valve openings, on each of which an overpressure valve is arranged, wherein the overpressure valves respond to different overpressure values of the fluid pressure in the fluid chamber. This implements an at least two-level remedial measure for overpressure. When the fluid pressure in the fluid chamber rises more and more, the overpressure valve which is designed for a lower overpressure value responds first and, if the fluid pressure rises further, the additional overpressure valve, which is designed for a higher overpressure value, also responds.

In a development of the invention, the at least one overpressure valve is capable of multilevel response to at least two different overpressure values of the fluid pressure in the fluid chamber, wherein the valve membrane body moves, at a first overpressure value, to a first overpressure position partially exposing the overpressure outlet opening with a first opening cross-section and, at a second overpressure value that is greater than the first overpressure value, to a second overpressure position exposing the overpressure outlet opening with a second opening cross-section that is greater than the first one. This implements an at least two-level remedial measure for overpressure on one and the same overpressure valve.

Additional features and advantages of the present invention will become apparent to those skilled in the art upon consideration of the following detailed description of the illustrative embodiments best exemplifying the best mode of carrying out the invention as presently perceived.

BRIEF DESCRIPTION OF THE DRAWINGS

Advantageous embodiments of the invention are illustrated in the drawings. These and further advantageous embodiments of the invention are described in greater detail below. In the drawings.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
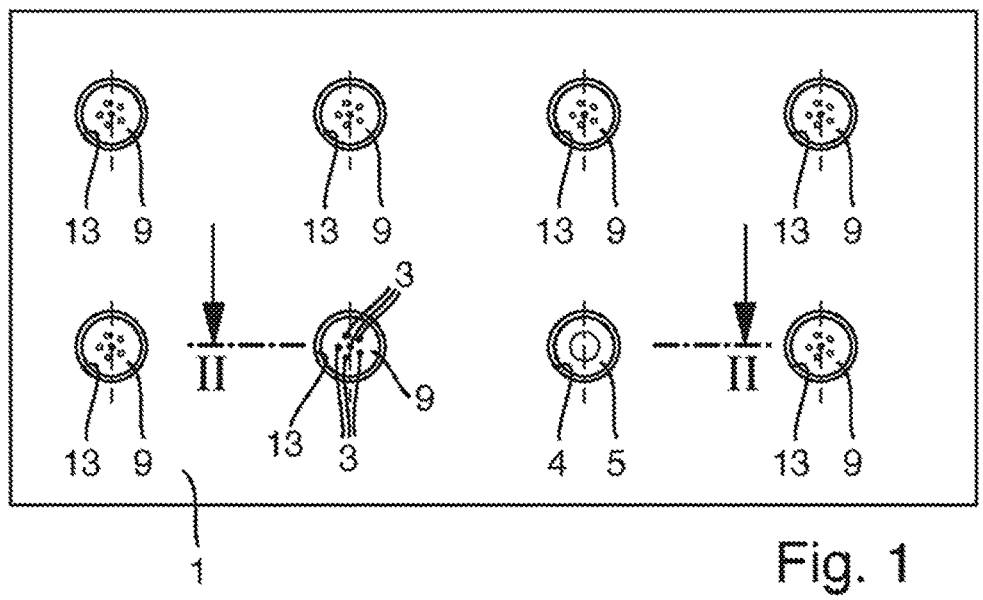
FIG. 1 shows a plan view of a segment of a shower jet generating device for a shower head.
Figure 2:
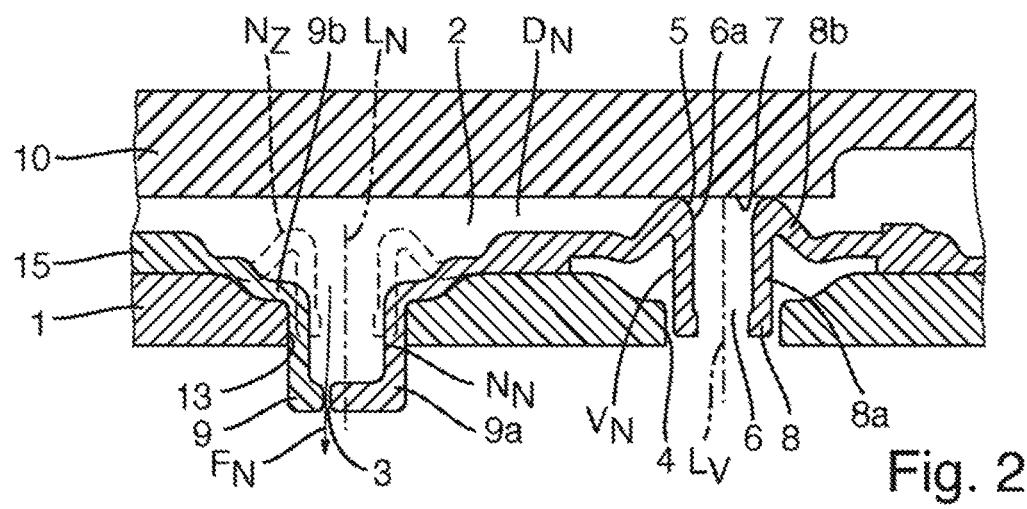
FIG. 2 shows a section through the shower jet generating device along a line II-II in FIG. 1 in a normal pressure state.
Figure 3:
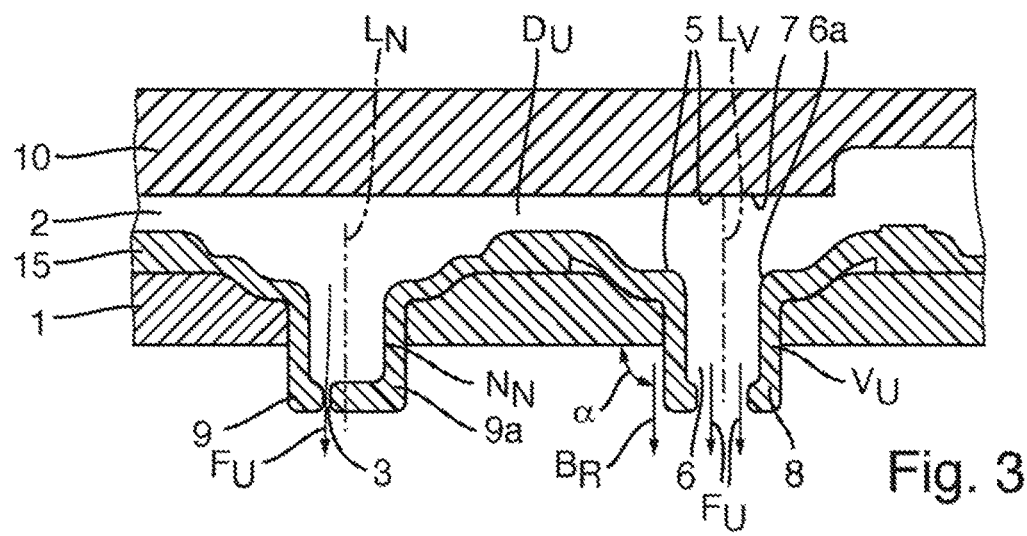
FIG. 3 shows the view from FIG. 2 in an overpressure state.

The shower jet generating device illustrated in FIGS. 1 to 3 comprises a shower jet disk 1 delimiting a fluid chamber 2 on an outlet side and including at least one jet outlet opening 3 leading out of the fluid chamber 2 and at least one overpressure valve opening 4. The shower jet generating device furthermore comprises at least one overpressure valve 5 disposed on the overpressure valve opening 4.

The overpressure valve 5 includes an overpressure outlet opening 6 leading out of the fluid chamber 2, an immobile valve seat 7 and a valve body, which is formed as a valve membrane body 8 made of an elastic material. The valve membrane body 8 interacts with the valve seat 7 and is capable of movement controlled by a fluid pressure in the fluid chamber 2. More specifically, the valve body 8 can be moved between a normal pressure position $V_N$ shown in FIG. 2 and an overpressure position $V_U$ shown in FIG. 3. In the normal pressure position $V_N$, the valve membrane body 8 rests against the valve seat 7 in such a way that the overpressure outlet opening 6 is closed. In the overpressure position $V_U$, the valve body 8 is lifted off the valve seat 7, and the overpressure outlet opening 6 is exposed.

The valve membrane body 8 comprises a cylindrical central portion 8a extending into the overpressure valve opening 4 and a deformably flap-movable boundary portion 8b surrounding the central portion 9a. The valve membrane body 8 moves with its central portion 8a within the overpressure valve opening 4 of the jet disk 1 between the normal pressure position $V_N$ and the overpressure position $V_U$ by the deforming flap movement of its boundary portion 8b, with a main directional component perpendicular to the shower jet disk 1. In other words, the central portion 8a moves substantially in translation in the overpressure valve opening 4 with a direction of movement $B_R$, which encloses an angle α between 45° and 90° with a disk plane or outside surface of the jet disk 1, the angle being 90° in the example shown. In the example shown, the overpressure position $V_U$ of the valve membrane body 8 is defined by the fact that it comes into contact by means of the boundary portion 8b with an associated inner region of the jet disk 1.

In corresponding embodiments, as in the example shown, the central portion 8a of the valve membrane body 8 is hollow cylindrical and comprises the overpressure outlet opening 6. The overpressure outlet opening 6 leads out of the valve membrane body 8 on its side facing away from the valve seat 7. The direction of movement $B_R$ of the central portion 8a is illustratively parallel to a longitudinal central axis $L_V$ of the central part 8a. In corresponding embodiments, the central portion 8a and/or the boundary portion 8b of the valve membrane body 8 is/are rotationally symmetrical with respect to this longitudinal central axis $L_V$. In alternative embodiments, the central portion of the valve membrane body is a solid cylinder, i.e. not hollow, and the overpressure outlet opening 6 is implemented in some other way.

In corresponding embodiments, as in the illustrative embodiment shown, the central portion 8a of the valve membrane body 8 is hollow cylindrical and comprises the overpressure outlet opening 6, and the overpressure outlet opening 6 leads into the valve membrane body 8 on its side facing the valve seat 7 by means of an inlet region 6a. In this case, the overpressure outlet opening 6 can simply be closed by the valve seat 7 resting against this inlet region 6a of the valve membrane body 8.

In corresponding embodiments, the fluid chamber 2, on its side facing away from the shower jet disk 1, is delimited by a chamber bottom plate 10 including the valve seat 7. The valve seat 7 is formed by a surface region of the chamber bottom plate 10 which faces the valve membrane body 8. In alternative embodiments, the fluid chamber 2 is delimited on the inside, i.e. on its side facing away from the shower jet disk 1, by some other conventional structure. In this case, the valve seat 7 is formed by some other conventional valve seat structure.

The jet outlet opening 3 of the shower jet disk 1 is used to provide the shower jet desired for the normal operation of the shower jet generating device. In the example shown, the jet outlet opening 3 of the jet disk 1 is formed by a jet outlet nipple 9 made of an elastic material, which nipple, like the valve membrane body 8, has a cylindrical central portion 9a and a deformably flap-movable boundary portion 9b surrounding the central portion. By virtue of the deforming flap movement of its boundary portion 9b, the jet outlet nipple 9 moves with its central portion 9a within a nipple outlet opening 13 of the jet disk 1 between a zero pressure position $N_Z$, indicated in dashed lines in FIG. 2, and a normal pressure nipple position $N_N$, illustrated by solid lines in FIG. 2, with a main directional component perpendicular to the shower jet disk 1. In its normal pressure position $N_N$, the jet outlet nipple 9 is supported by means of its boundary portion 9b against an associated inner region of the jet disk 1. In particular, the jet outlet nipple 9 can be formed as a fluid outlet element, as described in the above mentioned earlier German Patent Application 10 2016 219 551. In alternative embodiments, the jet outlet opening is formed directly by the jet disk, e.g. as a hole passing through the disk, or it is formed by a jet outlet nipple formed in some other way, which is immobile or moves in some other way.

In the example shown, the central portion 9a of the jet outlet nipple 9 is hollow cylindrical and, on the outlet side, i.e. towards the front or downwards in FIG. 2, ends in a pot shape with a bottom, into which the jet outlet opening 3 is introduced, wherein a plurality of jet outlet openings 3 is illustratively provided in the bottom, as is apparent from FIG. 1, in which one central and five further jet outlet openings 3 surrounding the latter are shown. In corresponding embodiments, the side wall of the central portion 9a and/or the boundary portion 9b of the jet outlet nipple 9 is/are rotationally symmetrical with respect to a longitudinal central axis $L_N$, which, for its part, is parallel to the extension and retraction movement of the jet outlet nipple 9. In particular, the jet outlet nipple 9 can be formed as a jet outlet element of the kind described in the above mentioned earlier German Patent Application 10 2016 225 987 for the shower jet outlet device in that document, the contents of which are herewith incorporated by reference into the present application and to which reference can be made for further details in relation to a jet outlet element of this kind. In particular, the jet outlet openings 3 in the bottom of the central portion 9a of the jet outlet nipple 9 can be fine jet openings.

As is conventional, a plurality of jet outlet nipples 9 or jet outlet openings 3 is illustratively provided in a regular distribution over the entire surface of the jet disk 1 or over partial areas, e.g. at various radii, as can be seen in the segment in FIG. 1. In corresponding embodiments, a plurality of overpressure valves 5 is furthermore provided as required, e.g. distributed over the jet disk surface instead of a respective jet outlet opening or of a jet outlet nipple or at intermediate positions of the regular distribution of the jet outlet openings or jet outlet nipples.

When the fluid supply is switched off and the fluid chamber 2 is unpressurized, the shower jet generating device is in a zero pressure state, in which the jet outlet nipple 9 occupies its retracted or folded-in zero pressure position $N_Z$. The overpressure valve 5 is in its normal pressure position $V_N$. When the fluid supply is open or activated and the shower jet generating device is in a normal pressure state, i.e. is operating in the intended, trouble-free manner without the occurrence of an overpressure, the fluid chamber 2 is supplied with fluid $F_N$ at normal operating pressure $D_N$. As a result, the central portion 9a of the jet outlet nipple 9 moves forwards out of the zero pressure position $N_Z$ into its normal nipple pressure position $N_N$ through the nipple outlet opening 13 of the jet disk 1 and, during this process, the bottom and/or the side wall of the jet outlet nipple may optionally be convexly deformed, preventing lime scale and dirt deposits on the jet outlet nipple 9 or enabling such deposits to flake off more easily. The overpressure valve 5 remains in its normal pressure position $V_N$ and holds its overpressure outlet opening 6 closed. The fluid $F_N$ thus emerges in the forward direction exclusively from the jet outlet opening or openings 3 and forms the desired shower jet.

When the fluid chamber 2 is depressurized again, e.g. by switching off the upstream fluid supply, the jet outlet nipple 9 moves back automatically into its zero pressure position $N_Z$. For this purpose, it is embodied with a corresponding elastic restoring action, especially by means of its boundary portion 9b.

When particle and/or lime scale deposits on the jet outlet nipple or nipples 9 or on the jet outlet opening or openings 3 or some other fault causes the fluid pressure in the fluid chamber 2 to rise beyond the level of the normal pressure $D_N$, up to an overpressure value $D_U$, for which the corresponding response threshold of the overpressure valve 5 is designed, the overpressure valve 5 opens, the valve membrane body 8 rising from the valve seat 7 and moving into its overpressure position $V_U$. This exposes the overpressure outlet opening 6, with the result that fluid $F_U$ under overpressure in the fluid chamber 2 can then additionally emerge forwards out of the fluid chamber 2 via the overpressure outlet opening 6. By means of suitable dimensioning of the outlet cross-section of the overpressure outlet opening 6, it is possible to ensure that the fluid pressure in the fluid chamber 2 is reduced with appropriate rapidity. In the embodiment with the jet outlet nipple or nipples 9, these are in the extended normal pressure position $N_N$ in the case of overpressure as well, ensuring that something of the overpressure fluid $F_U$ can emerge from the nipples too, as long as they are not blocked.

Thus, the fluid $F_U$ under overpressure can emerge forwards from the shower jet disk 1 via the overpressure valve 5, as shown, for example, in the same way as the fluid $F_N$ emerging from the jet outlet opening 3 in normal operation. As soon as the overpressure in the fluid chamber 2 has been dissipated and the fluid pressure once again reaches the normal pressure level of the normal pressure $D_N$, the valve membrane body 8 moves back automatically into its normal pressure position $V_N$. For this purpose, it is embodied with a corresponding elastic restoring action, especially by means of its boundary portion 8b. Here, the valve seat 7 serves as a limiting stop, i.e. it defines the normal pressure position $V_N$ of the valve membrane body 8.

In corresponding embodiments, the jet outlet nipple 9 and the valve membrane body 8 are formed integrally from the same elastic material, as in the example shown. In particular, they can be part of an integral jet mat 15 made of elastic material, which rests against the inside of the jet disk 1. As an alternative, they can be formed integrally as a twinned group. In further alternative embodiments, the jet outlet nipple 9 and the valve membrane body 8 are each formed as independent components made of the same elastic material or of different elastic materials. The different response behavior for the jet outlet nipple 9, on the one hand, which extends already at normal pressure $D_N$ in the fluid chamber 2, and the valve membrane body 8, on the other hand, which extends only when there is an overpressure $D_U$ in the fluid chamber 2, can be achieved in a simple manner by appropriately differing embodiment of the respective flexible boundary portion 9a or 9b. For this purpose, the boundary portion 9b of the jet outlet nipple 9 is made more flexible than the boundary portion 8b of the valve membrane body 8.

In corresponding embodiments, the shower jet disk 1 has at least two overpressure valve openings 4, at each of which an overpressure valve 5 is arranged. In the case of an overpressure, the fluid $F_U$ can thereby be discharged at each of several points from the fluid chamber 2 via a respective overpressure valve 5. In corresponding embodiments, the overpressure valves 5 can be completely identical in terms of construction and operation or, alternatively, can differ in their response behavior in that they respond to different overpressure values of the fluid pressure in the fluid chamber 2. Thus, for example, at least one first overpressure valve 5 can respond at a first overpressure value and at least one second overpressure valve 5 can respond at a second overpressure value, higher than the first, i.e. can expose its overpressure outlet opening 6. The differing response behavior can be achieved by means of correspondingly different configuration of the boundary portion 8b of the respective valve membrane body 8 in respect of its elastic bending behavior, for example.

In corresponding embodiments, the overpressure valve 5 is capable of multilevel response to at least two different overpressure values of the fluid pressure in the fluid chamber 2. In this case, the valve membrane body 8 moves, at a first overpressure value, to a first overpressure position partially exposing the overpressure outlet opening 6 with a first opening cross-section, in which it is raised only slightly from the valve seat 7 for example, and, at a second overpressure value that is greater than the first overpressure value, to a second overpressure position exposing the overpressure outlet opening 6 with a second opening cross-section that is greater than the first one, which can be the position $V_U$ shown in FIG. 3, for example, in which it is supported against the inside of the jet disk 1. In this case, the boundary portion 8a of the valve membrane body 8 is illustratively designed in such a way that it provides a stable intermediate position of the elastic flap movement of the valve membrane body 8 for the first overpressure position.

Figure 4:
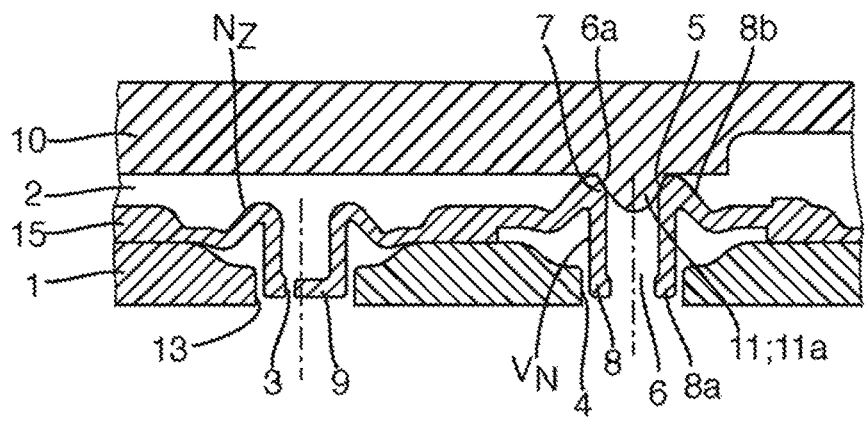
FIG. 4 shows a view corresponding to FIG. 2 of a variant having a spherical shut-off projection on a valve seat in a zero pressure state.
Figure 5:
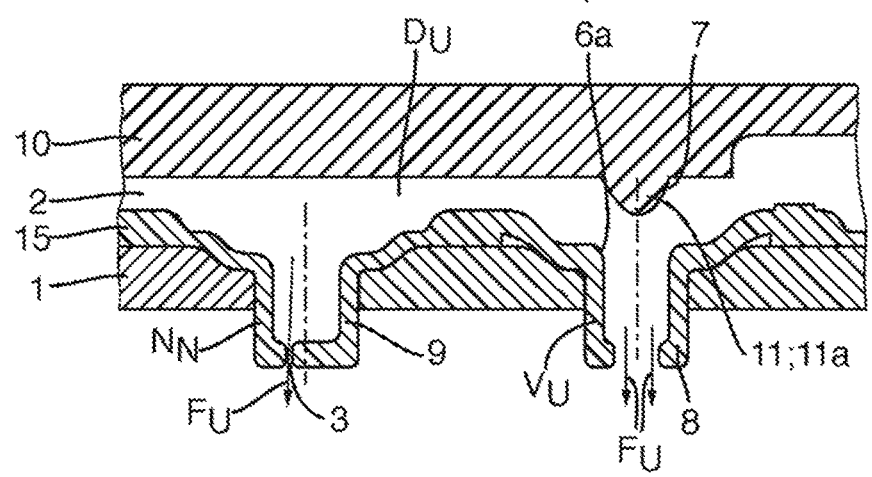
FIG. 5 shows the view from FIG. 3 of the variant in FIG. 4.

In corresponding embodiments, the valve seat 7 has a shut-off contour 11, which engages in the inlet region 6a of the overpressure outlet opening 6 in the normal pressure position $V_N$ of the valve membrane body 8. In a corresponding embodiment, the shut-off contour 11 is formed by a hemispherical shut-off projection 11a, as in the illustrative embodiment in FIGS. 4 and 5. In this case, FIG. 4 illustrates the zero pressure state with an unpressurized fluid chamber 2, in which the valve membrane body 8 is in its normal pressure position $V_N$ and the jet outlet nipple 9 is in its zero pressure position $N_Z$, while FIG. 5 illustrates the overpressure state, in which the valve membrane body 8 is in its overpressure position $V_U$ and the jet outlet nipple 9 is in its normal pressure position $N_N$.

Figure 6:
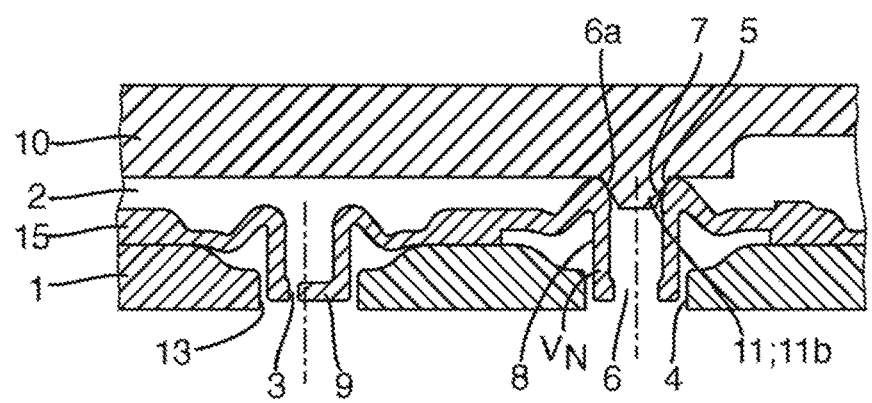
FIG. 6 shows the view from FIG. 4 of a variant having a conical shut-off projection on the valve seat.
Figure 7:
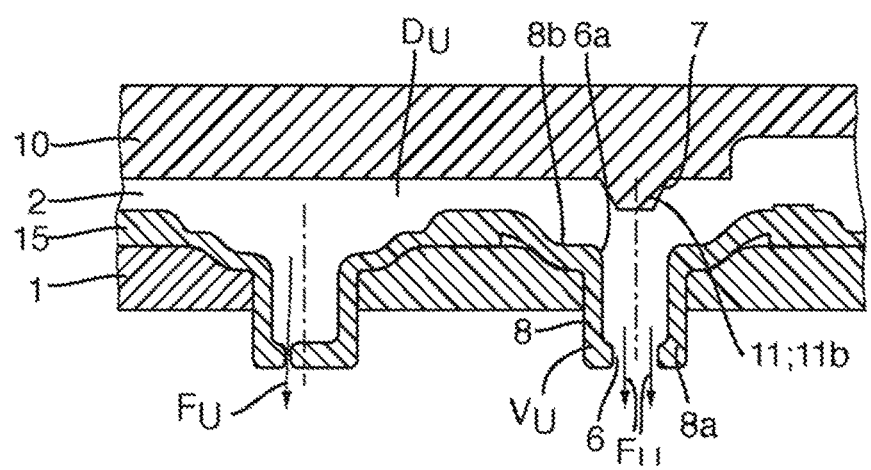
FIG. 7 shows the view from FIG. 3 of the variant in FIG. 6.

In an alternative embodiment, the shut-off contour 11 is formed by a conical shut-off projection 11b, as in the illustrative embodiment in FIGS. 6 and 7. Once again, FIG. 6 here illustrates the initial state of the shower jet generating device, in which it is free from fluid pressure, and FIG. 7 illustrates the overpressure state. By means of these and further possible, alternative shut-off contours of the valve seat 7, the sealing behavior of the valve seat 7 relative to the overpressure outlet opening 6 can be supported. In the embodiments that have the chamber bottom plate 10 having the valve seat 7, the shut-off contour 11 can be formed integrally with the chamber bottom plate 10 or as a separate projection from the same material as or a different material from the chamber bottom plate 10.

Figure 8:
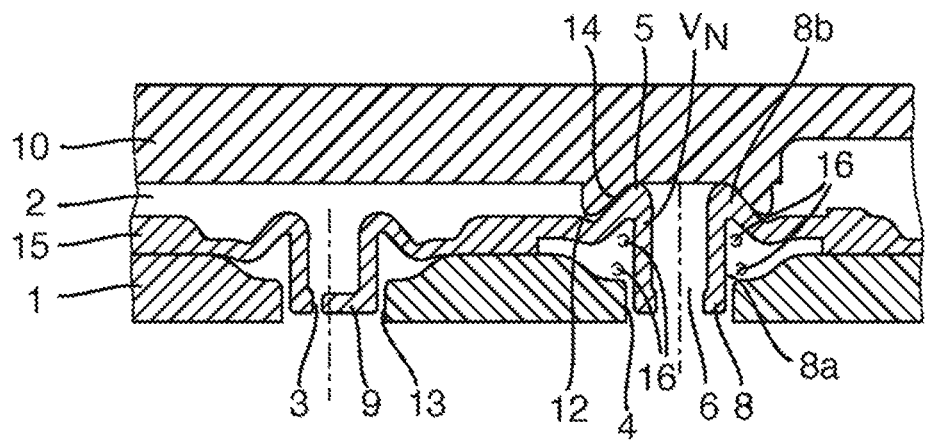
FIG. 8 shows the view from FIG. 4 of a variant having a frustoconical inner contour on the valve seat and spring preloading element.

In corresponding embodiments, the inlet region 6a of the overpressure outlet opening 6 can have a frustoconical outer contour 12 in the normal pressure position $V_N$ of the valve membrane body 8, and the valve seat 7 has a correspondingly frustoconical inner contour 14, as shown in FIG. 8 for an illustrative embodiment of this kind. In embodiments with the chamber bottom plate 10, the valve seat 7 having this frustoconical inner contour 14 can once again be formed integrally with the chamber bottom plate 10 or, as an alternative, can be disposed as a separate component on the chamber bottom plate 10. This valve seat configuration too can promote the sealing behavior of the overpressure valve 5. If required, this valve seat type can additionally be provided with the shut-off contour 11 engaging in the inlet region 6a of the overpressure outlet opening 6.

In corresponding embodiments, a spring-elastic element 16 is provided, which preloads the valve membrane body 8 against the valve seat in the direction of its normal pressure position $V_N$, as shown in dashed lines as an option by way of example in the embodiment in FIG. 8. A spring-elastic element 16 of this kind can accordingly also be provided in the other embodiments shown and embodiments mentioned in addition. The spring-elastic element 16 can be a helical compression spring, for example, as shown, or, alternatively, some other spring, such as a spiral compression spring or a helical or spiral tension spring. By means of the choice of an appropriate spring constant for the spring-elastic element 16, in addition to the design of the elastic behavior of the valve membrane body 8 and, in particular, of the annular portion 8b thereof, the overpressure response threshold for the overpressure valve 5 can be adjusted or controlled in the desired manner.

Figure 9:
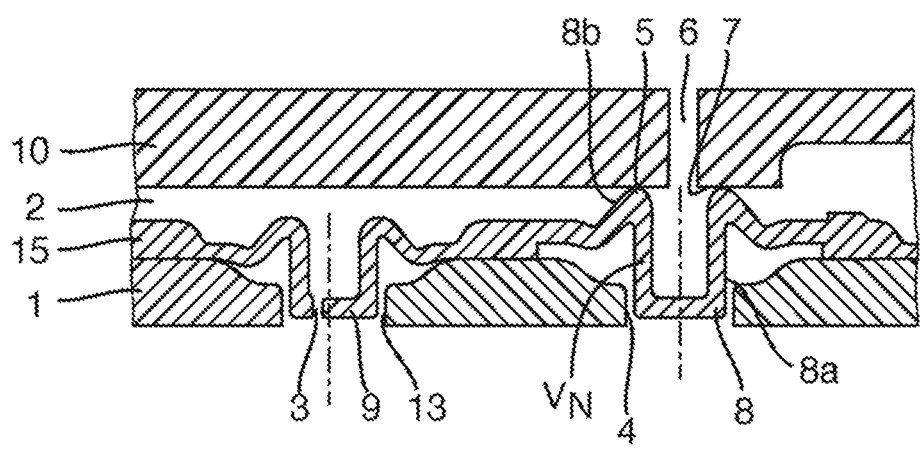
FIG. 9 shows the view from FIG. 4 of a variant having an overpressure outlet opening disposed in the valve seat.

In corresponding embodiments, the valve seat 7 has the overpressure outlet opening 6, which, in this case, leads into the valve seat 7 on its side facing the valve membrane body 8. FIG. 9 illustrates an illustrative embodiment relating to this. In this case, the valve membrane body 8 is of closed design and, in the normal pressure position $V_N$ shown, comes to rest by its illustrative annular boundary portion 8b against the valve seat 7 in such a way that the overpressure outlet opening 6 is surrounded in an annularly closed manner by the boundary portion 8b and is thereby separated from the fluid chamber 2. As a result, the overpressure outlet opening 6 remains closed in normal operation, and the fluid emerges forwards from the shower jet disk 1 exclusively via the jet outlet opening or openings 3.

In the case of overpressure, the valve membrane body 8 in this embodiment once again assumes its overpressure position $V_U$ and thereby exposes the connection from the overpressure outlet opening 6 to the fluid chamber 2. As a result, fluid under overpressure in the fluid chamber 2 can be discharged rearwards, i.e. away from the jet disk 1, through the overpressure outlet opening 6 of the valve seat 7, and not through the shower jet disk 1, as in the illustrative embodiments in FIGS. 2 to 8. The fluid discharged via the overpressure outlet opening 6 can be carried further in a desired manner on the rear side of the shower jet generating device, e.g. on the rear side of the chamber bottom plate 10. This variant embodiment is advantageous specifically for applications in which the emergence of fluid under overpressure towards the front from the shower jet disk 1 is not desired.

As the illustrative embodiments shown and the further illustrative embodiments mentioned above make clear, the invention makes available a shower jet generating device with a particularly advantageous overpressure valve implementation. In particular, the shower jet generating device can be used to advantage for sanitary shower heads, e.g. in sanitary overhead showers, hand-held showers or lateral jet showers as well as extendable shower heads for kitchens, but also for non-sanitary shower heads, wherever there is a need to make available overpressure protection for a shower head.

Although the invention has been described in detail with reference to certain preferred embodiments, variations and modifications exist within the spirit and scope of the invention as described and defined in the following claims.

The invention claimed is:

1. A shower jet generating device for a shower head comprising:
    a shower jet disk delimiting a fluid chamber on an outlet side and including at least one jet outlet opening leading out of the fluid chamber and at least one overpressure valve opening; and
    at least one overpressure valve disposed on the overpressure valve opening, the at least one overpressure valve including an overpressure outlet opening leading out of the fluid chamber, an immobile valve seat and a valve body capable of movement controlled by a fluid pressure in the fluid chamber and interacting with the valve seat, the valve body, in a normal pressure position, resting against the valve seat, thereby closing the overpressure outlet opening, and, in an overpressure position, is lifted off the valve seat, thereby exposing the overpressure outlet opening;
    wherein the valve body is formed as a valve membrane body made of an elastic material, which valve membrane body comprises a cylindrical central portion extending into the overpressure valve opening and a deformably flap-movable boundary portion surrounding the central portion, wherein the valve membrane body moves with its central portion within the overpressure valve opening between the normal pressure position and the overpressure position by the deforming flap movement of the boundary portion, with a main directional component perpendicular to the shower jet disk.

2. The shower jet generating device according to claim 1, wherein the fluid chamber, on its side facing away from the shower jet disk, is delimited by a chamber bottom plate including the valve seat.

3. The shower jet generating device according to claim 1, wherein the central portion of the valve membrane body is hollow and cylindrical and comprises the overpressure outlet opening, and the overpressure outlet opening leads out of the valve membrane body on its side facing away from the valve seat.

4. The shower jet generating device according to claim 1, wherein the central portion of the valve membrane body is hollow and cylindrical and comprises the overpressure outlet opening, and the overpressure outlet opening leads into the valve membrane body on its side facing towards the valve seat.

5. The shower jet generating device according to claim 4, wherein the valve seat comprises a shut-off contour engaging in an input region of the overpressure outlet opening in the valve membrane body, in the normal pressure position of the valve membrane body.

6. The shower jet generating device according to claim 4, wherein an input region of the overpressure outlet opening in the valve membrane body comprises a frustoconical outer contour, in the normal pressure position of the valve membrane body, and the valve seat comprises a corresponding frustoconical inner contour.

7. The shower jet generating device according to claim 5, wherein the shut-off contour is formed by a hemispherical or conical shut-off projection.

8. The shower jet generating device according to claim 1, wherein the valve seat comprises the overpressure outlet opening, and the overpressure outlet opening leads into the valve seat on its side facing towards the valve membrane body.

9. The shower jet generating device according to claim 1, wherein the at least one jet outlet opening is formed by a jet outlet nipple which is formed from the elastic material integral with the valve membrane body.

10. The shower jet generating device according to claim 1, wherein the at least one jet outlet opening is formed by a jet outlet nipple made of an elastic material, which nipple has a hollow cylindrical central portion extending into a nipple outlet opening of the jet disk and a deformably flap-movable boundary portion surrounding the central portion, wherein the jet outlet nipple moves with its central portion within the nipple outlet opening between a zero pressure position and a normal pressure position by the deforming flap movement of its boundary portion, with a main directional component perpendicular to the shower jet disk.

11. The shower jet generating device according to claim 1, wherein the shower jet disk comprises at least two overpressure valve openings, each provided with a respective overpressure valve, wherein the overpressure valves respond to different overpressure values of the fluid pressure in the fluid chamber.

12. The shower jet generating device according to claim 1, wherein the at least one overpressure valve is capable of multilevel response to at least two different overpressure values of the fluid pressure in the fluid chamber, wherein the valve membrane body moves, at a first overpressure value, to a first overpressure position partially exposing the overpressure outlet opening with a first opening cross-section and, at a second overpressure value that is greater than the first overpressure value, to a second overpressure position exposing the overpressure outlet opening with a second opening cross-section that is greater than the first one.

* * * * *